United States Patent [19]
Bruno et al.

[11] Patent Number: 5,563,882
[45] Date of Patent: Oct. 8, 1996

[54] PROCESS FOR CONVERTING A POINT-TO-POINT MULTIMEDIA CALL TO A BRIDGED MULTIMEDIA CALL

[75] Inventors: Richard F. Bruno, Morristown; Robert E. Markowitz, Glen Rock; Roy P. Weber, Bridgewater, all of N.J.

[73] Assignee: AT&T, Holmdel, N.J.

[21] Appl. No.: 507,868

[22] Filed: Jul. 27, 1995

[51] Int. Cl.⁶ ............................ H04Q 11/04; H04N 7/15
[52] U.S. Cl. .............................. 370/62; 379/202; 348/15; 348/16
[58] Field of Search ............................... 370/62, 58.1, 60; 379/202, 203–206; 348/16, 17, 15, 14, 13

[56] References Cited

U.S. PATENT DOCUMENTS 4,472,798  9/1984  Hafer ........................................ 370/62

OTHER PUBLICATIONS

William J. Clark, "Multipoint Multimedia Conferencing", IEEE Communications Magazine, May 1992, pp. 44–50.

*Primary Examiner*—Douglas W. Olms
*Assistant Examiner*—Matthew C. Phillips
*Attorney, Agent, or Firm*—Barry H. Freedman; Robert B. Levy

[57] ABSTRACT

A process for converting a point-to-point multimedia call into a bridged multimedia call for accommodating multi-party conferencing. The process utilizes the bearer channel configuration of the standard BRI format to disconnect, one at a time, each bearer channel from the point-m-point call and to reconnect each line to a multipoint control unit, whereupon the reconnected lines are individually reformatted in accordance with standard video phone protocol. The process facilitates the continuous and uninterrupted exchange of audio information and data between the point-to-point participants throughout the disconnection and reconfiguration stages of the conversion.

16 Claims, 4 Drawing Sheets

PROCESS FOR CONVERTING A POINT-TO-POINT MULTIMEDIA CALL TO A BRIDGED MULTIMEDIA CALL

BACKGROUND OF THE INVENTION

I. Field of the Invention

This invention broadly relates to multimedia conferencing wherein two or more users interact visually and audibly and are able to concurrently share data such as spreadsheets, reports, etc. More particularly, the present invention pertains to multimedia conferencing in which two or more users interact with each other through the use of terminal equipment having audio and video input/output capabilities. Most particularly, the present invention is directed to a process for converting an existing or ongoing point-to-point multimedia telephone call into a bridged call wherein the point-to-point call terminal devices are connected to a common video bridge such as a multipoint control unit (MCU) while maintaining between the participants a continuous exchange of audio information throughout the conversion process.

II. Discussion of Background Art

Recent developments in telecommunications provide the capability of video calling wherein two users communicate and interact with each other over a direct transmission link or telephone line, such as an Integrated Services Digital Network (ISDN) line, via the use of terminal equipment having audio and video input/output capabilities. In general, the terminal equipment used in video calling is a workstation containing a microphone and speaker for audio exchange, a video camera and screen for video exchange and a computer for the exchange of data which may comprise, for example, reports, spreadsheets, graphs, etc.

Video call information is commonly configured into a data string format comprised of two bearer (B) channels (with each channel carrying either 56 or 64 kilobits per second (kb/s)) and a signal channel (D) of 16 kb/s; this format is commonly referred to as 2B+D or Basic Rate Interface (BRI) format. Video call information can alternatively be configured into a Primary Rate Interface (PRI) format, also referred to as a 23B+D format, which is a data string comprised of 23 bearer (B) channels and a signal channel (D) of 64 kb/s. For standard data configuration most video calls utilize the H.320 video telephone protocol which configures the initially connected bearer channel to carry that portion of the data string representing all of the audio and data information (reports, spreadsheets, etc.) as well as a small portion of the video information, and configures the later-connected bearer channel(s) to carry the remainder of the video information.

In a video call, two users can interact directly via a point-to-point connection either through a local central office for a local call, or through a main switching station for a toll call. Users may also interact indirectly via use of a video bridge, such as multipoint control unit (MCU), wherein each workstation is connected to and shares a common MCU. When an MCU is used, such interaction is referred to as multimedia conferencing and, through the use of additional ports on the MCU, one or numerous additional third party users to a multimedia conference can be accommodated in the conference by connecting additional workstations to the MCU.

The basic features of an MCU are described, by way of example, in M. J. Koenig, et. al., "MCUs Help Take The Worry Out Of Being There", AT&T Technology Products, Systems and Services, Vol. 9, No. 4, Winter, 1994, pages 12–15, the entirety of which is incorporated by reference herein. Basically, an MCU synchronizes a multiplexed data bit stream comprised of voice, video and data which originates from each workstation endpoint, ensures a compatible set of audio and video parameters for the video conference from the options communicated by the control sequences received from the other workstation endpoints, and then decodes and sums the audio streams from all users for broadcast to the conference call participants.

To initiate a video conference call between, for example, three separate workstations having a user or participant at each, a reservation must first be made to reserve the necessary ports on an MCU to which the participating workstations will be connected. Thus, for a multimedia conference the number of connected workstations will be specified along with the starting time of the conference so that the system or network to which the MCU is connected can accommodate the intended number of participants at the pre-selected conference starting time.

Such an above-described technique, wherein reservations must first be made for the desired number of ports on an MCU, is readily employed when the number of participants and the approximate starting time for a multimedia conference are known. However, if a multimedia call is first commenced between two participants, i.e. a point-m-point call between user A and user B, and during that point-to-point call it becomes desirable or necessary to include at least a third participant, i.e. user C, there is at present no known technique for uninterruptedly accommodating the connection of user C's workstation to the ongoing point-to-point call. Thus, in order to include user C, the existing point-to-point multimedia call between users A and B must first be terminated, a reservation for the desired number of ports and time on an MCU must be made, and a new conference call then initiated between all intended participants, i.e. users A, B and C. As will be appreciated, such a disruption to the existing and ongoing point-to-point video call between users A and B is not only inconvenient but is likely to break the flow of the discussion and/or exchange of information between users A and B, and thereby defeat the very reason for desiring the addition of one or more new participants to the conference.

SUMMARY OF THE INVENTION

As stated above, terminating an existing point-to-point video call between two users to provide for additional participants to a multimedia conference call is inefficient and counterproductive because the point-to-point participants must find a suitable termination point in their ongoing discussion and thereafter commence a new multimedia conference call to add the desired third parties once the necessary MCU ports are reserved. Accordingly, it would be desirable to have a process for converting an ongoing point-to-point multimedia conference call into a multiparty conference call without disruption of the ongoing exchange of audio information and/or data while the additional parties are added.

The present invention thus provides, inter alia, a process for converting an existing or ongoing point-to-point multimedia telephone call into a bridged call for facilitating conferencing with one or more third parties. A point-to-point multimedia telephone call is an exchange between two users or participants of video, audio and data, such as spreadsheets, files, etc., through their respective workstations which are connected to each other via an integrated systems digital network (ISDN) line or the like configured for concurrently carrying video and audio information bit streams. The ISDN line has a signal channel and multiple bearer channels which carry the video and audio information exchanged between the connected workstations. Thus, for example, in a BRI (2B+D) ISDN format, one bearer channel is formatted for carrying audio, data and a small portion of the video information, and the second or other bearer channel is formatted for carrying only video information.

The inventive process facilitates conversion of an ongoing point-to-point multimedia call into a bridged call while providing for the continued exchange of audio information during the conversion process. In particular, and in the context (by way of example) of an ISDN line configured as a 2B+D format wherein the first bearer channel is formatted for carrying video, audio and data information and the second bearer channel is formatted for carrying only video information, the inventive process is performed by first disconnecting the second bearer channel from the point-to-point call and connecting that channel to an available port on a multipoint control unit (MCU). The second bearer channel is then reformatted to carry the audio, data and video information bit streams of the first bearer channel. While the second bearer channel is disconnected, the first bearer channel remains connected in the point-to-point call so that audio information and/or data, as well as a small amount of video information, can still be exchanged between the terminal devices.

After the second bearer channel has been reformatted, acknowledgement of a successful connection of the reformatted second bearer channel is provided to the terminal devices; the first bearer channel is then disconnected from the point-to-point call and connected to another port on the MCU. The first bearer channel is then reformatted as a video-only channel to carry the video information bit stream of the original second bearer channel of the point-to-point call. When the first bearer channel has been disconnected, audio information, data and a small amount of video information can continue to be exchanged between the terminal devices in an indirect manner, i.e. through the MCU. Thus, even when either bearer channel is disconnected, audio information as well as data and a small amount of video information can still be exchanged between the terminal devices.

In a preferred embodiment, before the second bearer channel is disconnected from the point-to-point call a determination must be made as to the availability of the desired number of ports on the MCU. Thus, the preferred process further includes the step of querying the MCU from one of the terminal devices to determine availability of the desired number of ports.

In another preferred embodiment, each MCU port has a corresponding address assigned thereto and the addresses of some of the available and reserved ports are provided to the terminal device that initiated the query, whereby that device will provide the designated port addresses to the other terminal device of the point-to-point call. The addresses are then used by each terminal device to access the corresponding available MCU ports. The exchange of data discretes such as port addresses and acknowledgments between the terminal devices can be accomplished through the bearer channels or through the signal channel of the ISDN line. However, use of the signal channel is most preferred. Upon connection of both terminal devices to a common MCU, third party terminal devices can then be freely added to the MCU for multiparty conferencing.

Other features of the present invention will become apparent from the following derailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE PREFERRED EMBODIMENTS

Multimedia conferencing, as used herein, is the exchange of audio, video and data information between users or participants through their respective workstations which are connected to an Integrated Systems Digital Network line (ISDN) configured, for example, as a BRI (2B+D) format. In general, each workstation is equipped with audio and video input/output means as well as data transfer means such, for example, as a computer.

Figure 1:
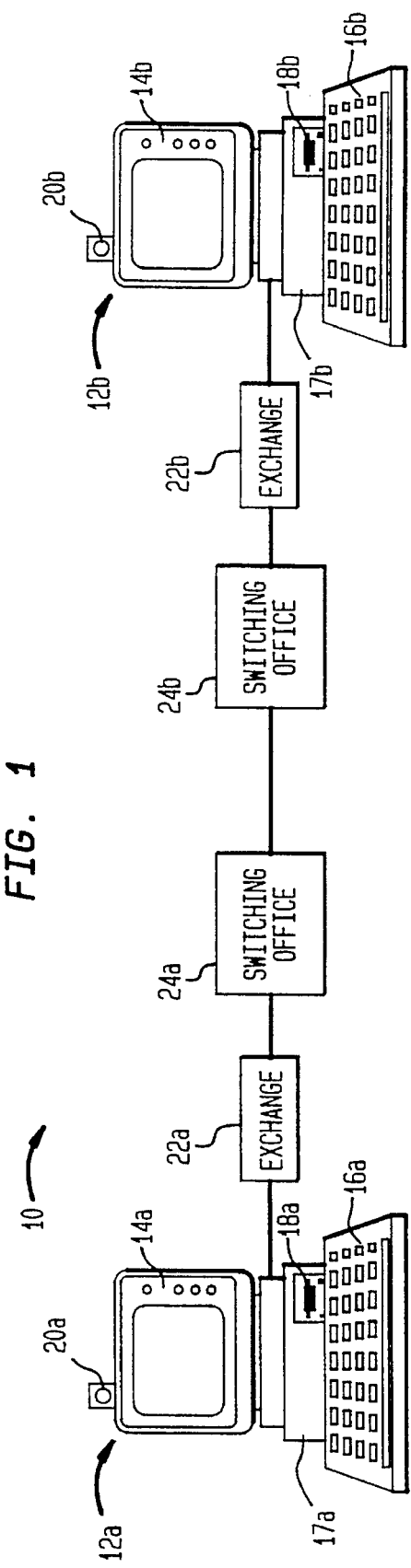
FIG. 1 is a schematic block diagram representing a point-to-point multimedia telephone call.

Turning to the drawings, and initially to FIG. 1, a block representation of a point-to-point or two-party multimedia call is depicted and is generally designated as 10. As shown, the point-to-point call interconnects two workstations 12a and 12b. Each workstation 12 typically includes a CRT or other viewing screen 14 for video output and the display of data in such forms as reports, spreadsheets, graphs, etc., a keyboard 16 for entering and accessing data, a processor 17 for processing data, audio input and output means 18 such as a microphone and/or speaker, and a video input means such as a video camera 20. The workstations 12 are shown interconnected via an ISDN line through, by way of example, a local central office (LCO) or exchange 22 and a toll or long distance switching office 24. It should be noted, however, that for a local call the toll switching office 24 would not be required and a direct connection from each workstation's respective local central office 22 to either the local central office or long distance switching office associated with the other workstation may be effected. Similarly, using privately owned local telephone lines the workstations can be directly interconnected one to the other without any interposed local central office 22.

As stated above, information exchanged during multimedia or video calls is currently placed in a data bit string format carried on an ISDN line configured as either a BRI (2B+D) format or a PRI (23B+D) format. With specific reference (by way of example) to a BRI format, such format consists of two bearer channels (with each channel carrying either 56 or 64 kilobits per second (kb/s) and a signal channel (D) carrying or accommodating 16 kb/s. In a 2B+D format, one bearer channel is configured for carrying the voice, data (such as documents, texts, etc.), and a small amount of video information, and the other bearer channel is used solely for video information, i.e. for enhanced resolution and improved video imaging. When a point-to-point video call is commenced, the first connected bearer channel will automatically be formatted by the protocol of the system (such as the H.320 protocol) as the channel carrying the voice, data and a portion of video information, whereas the second connected channel will be formatted for carrying only video information.

If during a point-to-point call between workstations 12a and 12b it is desired to include additional third party participants who will interact through their respective terminal devices such as workstations, the point-to-point call must first be reconfigured or converted to a bridged call wherein workstations 12a and 12b are disconnected from the existing point-to-point configuration and re-connected to a bridge, such as through an MCU, which can also accommodate the addition of third party terminal devices or workstations. Of course, the conversion process should result in little, if any, disruption in the exchange of information between workstations 12a and 12b and, therefore, it is desirable to provide for the continuous exchange of at least the audio information and data, as well as some video information, between these workstations.

Figure 2:
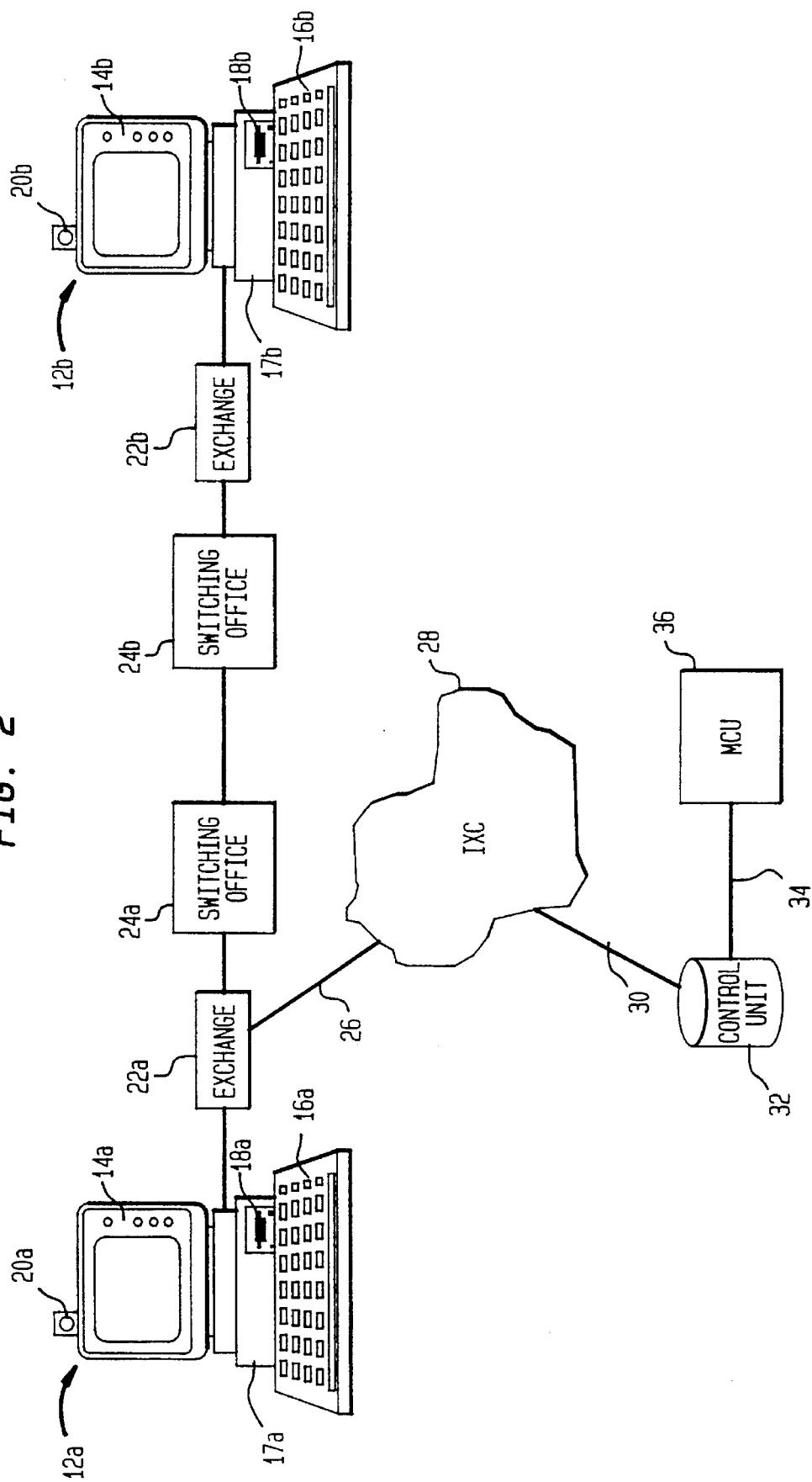
FIG. 2 is a block representation of an intermediate stage of the present invention.

As explained above, prior to initiating a multimedia or video conference call a determination as to the availability of the desired number of conference ports on an MCU must be made and, if the desired number of ports are available, they must be reserved for use. This determination, which is executed in the form of a query sent by either of the point-to-point workstations 12a or 12b, is depicted in FIG. 2 wherein workstation 12a is shown as the querying device. Thus, if during an ongoing point-to-point call between users at workstations 12a and 12b it is desired to include additional third parties, either workstation (12a or 12b) can query the system by sending a request to determine if the desired number of ports on an MCU are available and, if so, to reserve those ports for subsequent use. In the preferred embodiment, the query is sent through a local central office on a packet communication link 26 to a packet network of interexchange carrier 28 which, in turn, sends the query on another packet communication link 30 to a conference control unit 32. The conference control unit 32 is connected through a connection line 34 to an MCU 36.

The conference control unit 32 controls the operation of MCU 36 such, for example, as by reserving the required number of MCU ports for subsequent connection to various terminal devices. Thus, the conference control unit 32 maintains an inventory of available MCU ports at any given time. If the desired number of ports are available, the conference control unit 32 will reserve these ports and provide workstation 12a with an acknowledgement indicating that the conference request placed by terminal 12a can be accommodated, and will also provide workstation 12a with addresses and other data bit discretes required for the conference. Although conference control unit 32 is shown connected to a single MCU 36, it will be understood and appreciated by those having ordinary skill in the art that a plurality of MCUs may also be connected to a conference control unit 32 whereby the conference control unit maintains a current or running inventory of all available MCU ports on the plurality of connected MCUs and will, likewise, reserve the necessary conference ports on one such MCU of the connected plurality.

For a 2B+D format which incorporates two bearer channels, an MCU port is needed for each workstation. Thus, when converting a two-way point-to-point call to an MCU connected call, two MCU ports are needed. If a single third party is to be added, a third additional port is also needed, etc. Thus, when a query is sent by, for example, workstation 12a to conference control unit 32, the query will also specify the number of intended participants to the conference, thus alerting the conference control unit 32 as to the required number of MCU ports. Each MCU port has two corresponding addresses (such as telephone numbers) associated therewith, one for each bearer channel, and the addresses of only the reserved ports for workstations 12a and 12b are provided by the conference control unit 32 to workstation 12a via packet communication links 26 and 30. As the point-to-point call is ongoing during the reservation stage, and the bearer channels are thus directly connected at that time to each workstation, the query and communication between workstations 12a and the conference control unit 32 are carried by the signal portion or D-channel of the BRI-formatted ISDN line.

Once the addresses of the available reserved MCU ports are provided to workstation 12a, the port addresses for use by workstation 12b are then provided by workstation 12a to workstation 12b. An acknowledgment of successful receipt of the addresses is then provided by workstation 12b to workstation 12a. This communication of data discretes (addresses, acknowledgements, etc.) between the point-to-point workstations 12a and 12b can be conveyed either through the bearer channels—i.e. by occupying a portion of the second bearer channel carrying video-only information—or through the signal portion or D-channel of the BRI line. However, it is preferred that the signal portion be used for the transfer of data discretes as this does not reduce the available bandwidth or data-carrying capacity of the second bearer channel.

Figure 3:
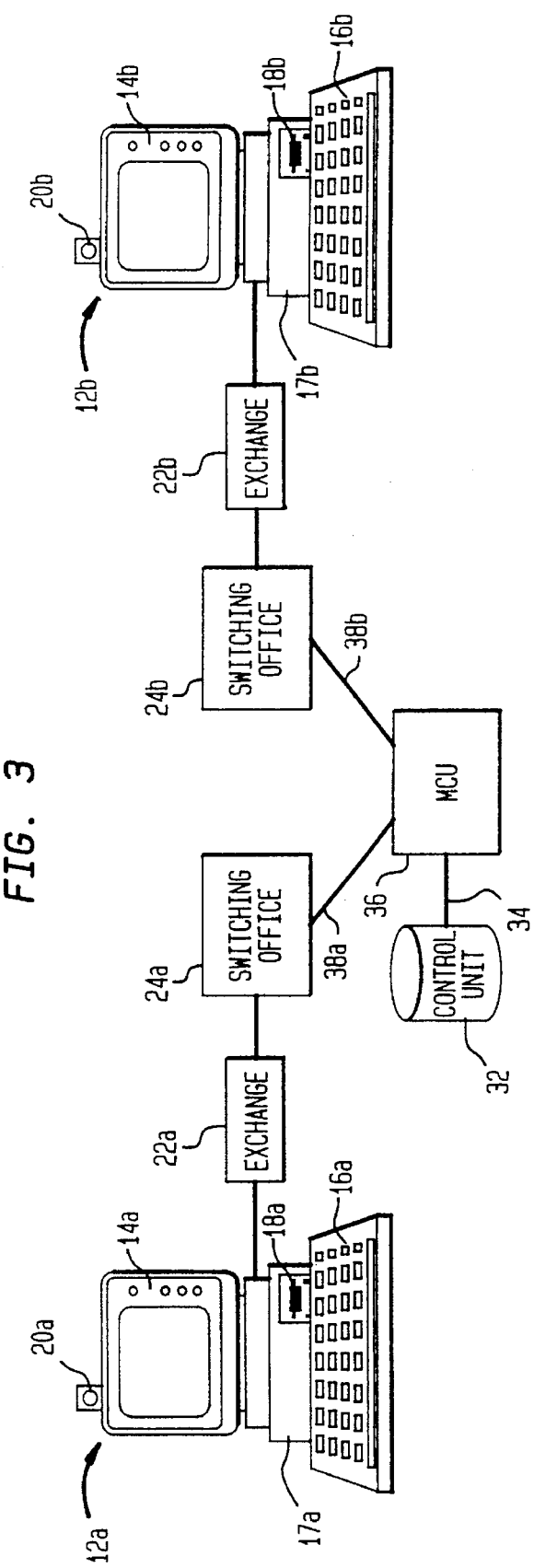
FIG. 3 is a block representation of a subsequent intermediate stage of the present invention.

With reference now to FIG. 3, upon successful conveyance of the available reserved MCU port addresses to workstation 12b, the second bearer channel—i.e. that channel containing only video information—of the point-to-point call is dropped, whereupon workstation 12a dials the phone numbers corresponding to one of the port addresses of MCU 36 and reconnects the dropped second bearer channel to the newly-dialed reserved MCU port via a connection line 38a, e.g. to form an MCU-connected second bearer channel. Again, although line 38 is shown as connecting MCU 36 to toll switching office 24a, this connection can likewise be made between MCU 36 and local central office 22a.

Upon successful connection by workstation 12a of the second bearer channel to one of the MCU reserved ports, a standard protocol for video phones, such as the H.320 protocol, is instituted for reformatting the MCU-connected second bearer channel, which connects workstation 12a to the MCU 36, into a format identical to that of the first bearer channel, i.e. to a format for carrying audio, data and a small amount of video information. Once reformatting is complete, the information or data bit streams carried by the still-connected point-to-point first bearer channel are duplicated on the newly reformatted second bearer channel now connected between workstation 12a and MCU 36. It should be noted that throughout this stage, the identical situation occurs with respect to workstation 12b. In other words, workstation 12b uses the phone numbers provided by workstation 12a and which correspond to the MCU reserved ports to connect its second bearer channel to the corresponding MCU port whereupon that channel is, likewise, reformatted for carrying audio, data and a small amount of video information.

With continued reference to FIG. 3, once workstations 12a and 12b are successfully connected to MCU 36 and the MCU-connected second bearer channel connecting the MCU to each workstation has been reformatted from carrying substantially only video information to carrying the identical information as the first bearer channel—i.e. audio, data and a small amount of video information—workstation 12a then disconnects or drops its existing first bearer channel and uses the phone number of the remaining reserved MCU port address to connect its new-disconnected first bearer channel to MCU 36, i.e. to form an MCU-connected first bearer channel. Upon successful connection, the H.320 protocol is again used for reformatting the MCU-connected first bearer channel into a substantially video-only channel for carrying the video information bit streams that were heretofore carried by the original point-to-point call second bearer channel. The same procedure likewise occurs with respect to workstation 12b and that workstation's connection of its first bearer channel to MCU 36. With both workstations successfully connected to their respective reserved MCU ports, the workstations no longer directly communicate with each other through a point-to-point call but, instead, now communicate indirectly through the MCU 36.

A principal benefit of the inventive process is that it provides for the continuous and uninterrupted exchange of audio information and data throughout the conversion process. As has been pointed out, the second bearer channel (which is the first-to-be-dropped bearer channel) is that channel which was initially formatted for carrying only video, whereas the later-dropped bearer channel is that which was initially formatted for carrying audio and data information as well as a small amount of video information. Thus, while the original second bearer channel is in the process of being connected to the MCU and reformatted, the participants in the point-to-point call may continue to still exchange voice and other audio and data via the remaining directly connected bearer channel (channel 1). In addition, although video clarity will degrade during the relatively short period of time extending from disconnection of the second bearer channel to successful connection of the first bearer channel to the MCU, some video imaging will remain present via the reduced bandwidth video information carried on the first bearer channel. However, once the second bearer channel has been connected to the MCU from both workstations and reformatted to the format of the first bearer channel, and the first bearer channel from the point-to-point call is then disconnected, the call participants can continue to exchange audio information and data via MCU 36 through the newly reformatted and connected second bearer channel. Again, as the newly reformatted second bearer channel contains only a portion of the video information that the first bearer channel contained, some video information or image is still present. Of course, when the first bearer channel has thereafter been successfully reformatted and connected to the MCU 36, the video information will return to its initial enhanced resolution as the newly reformatted first bearer channel carrier provides the remainder of the video information bit stream.

Figure 4:
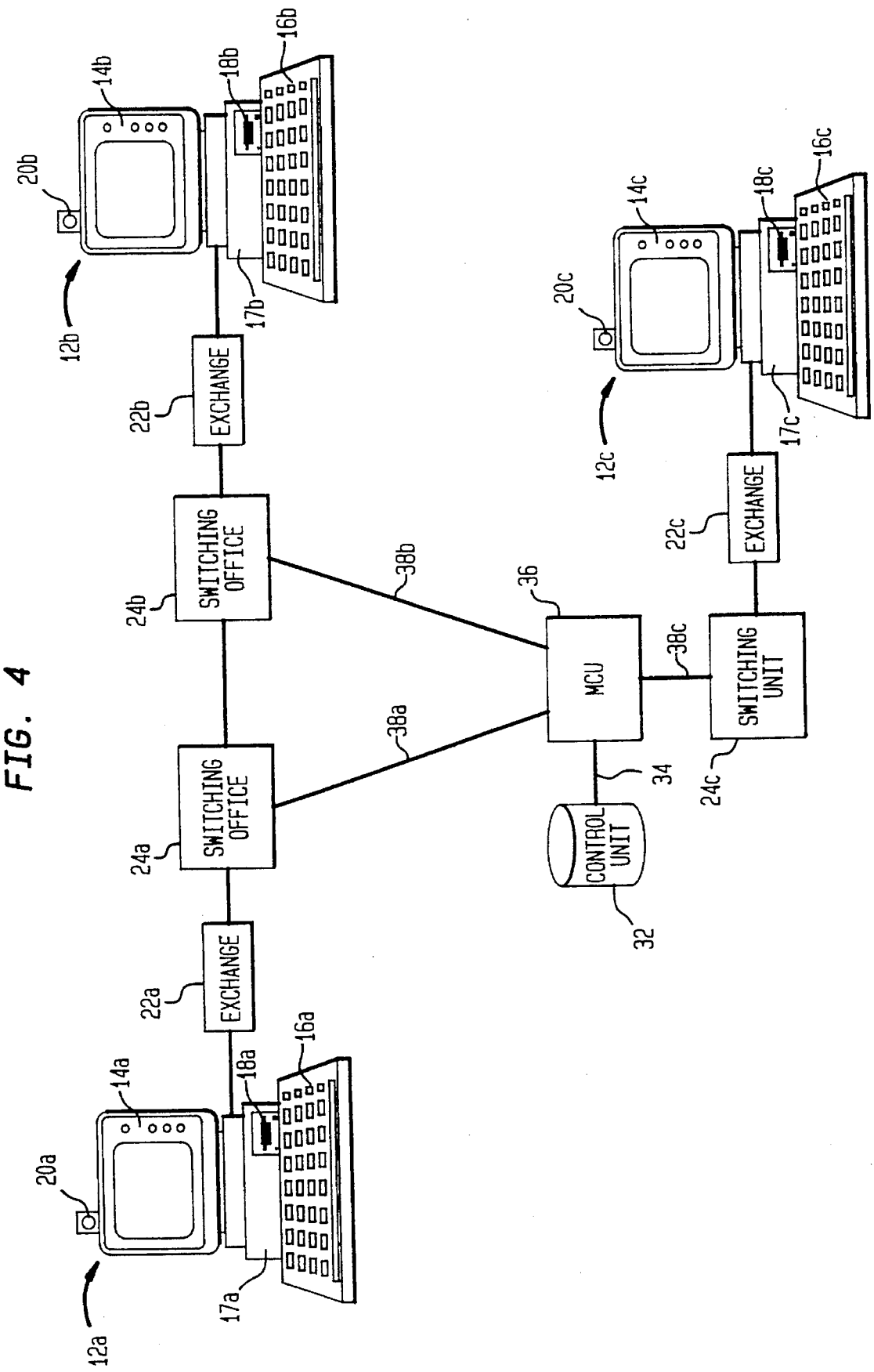
FIG. 4 is a block representation of yet another subsequent stage of the present invention.

With workstations 12a and 12b successfully connected to MCU 36, the MCU then uses the addresses of the remaining reserved ports to contact and connect additional third party workstations. Thus, and with reference now to FIG. 4, if only a single additional third party who will participate through workstation 12c is to be added, three reserved MCU ports are required, i.e. one port for workstation 12a, one for workstation 12b, and a third for workstation 12c. That third port connects the two bearer channels from workstation 12c to MCU 36. If additional third parties are required, it will be necessary to reserve a like number of additional MCU ports to accommodate such additional parties.

Figure 5:
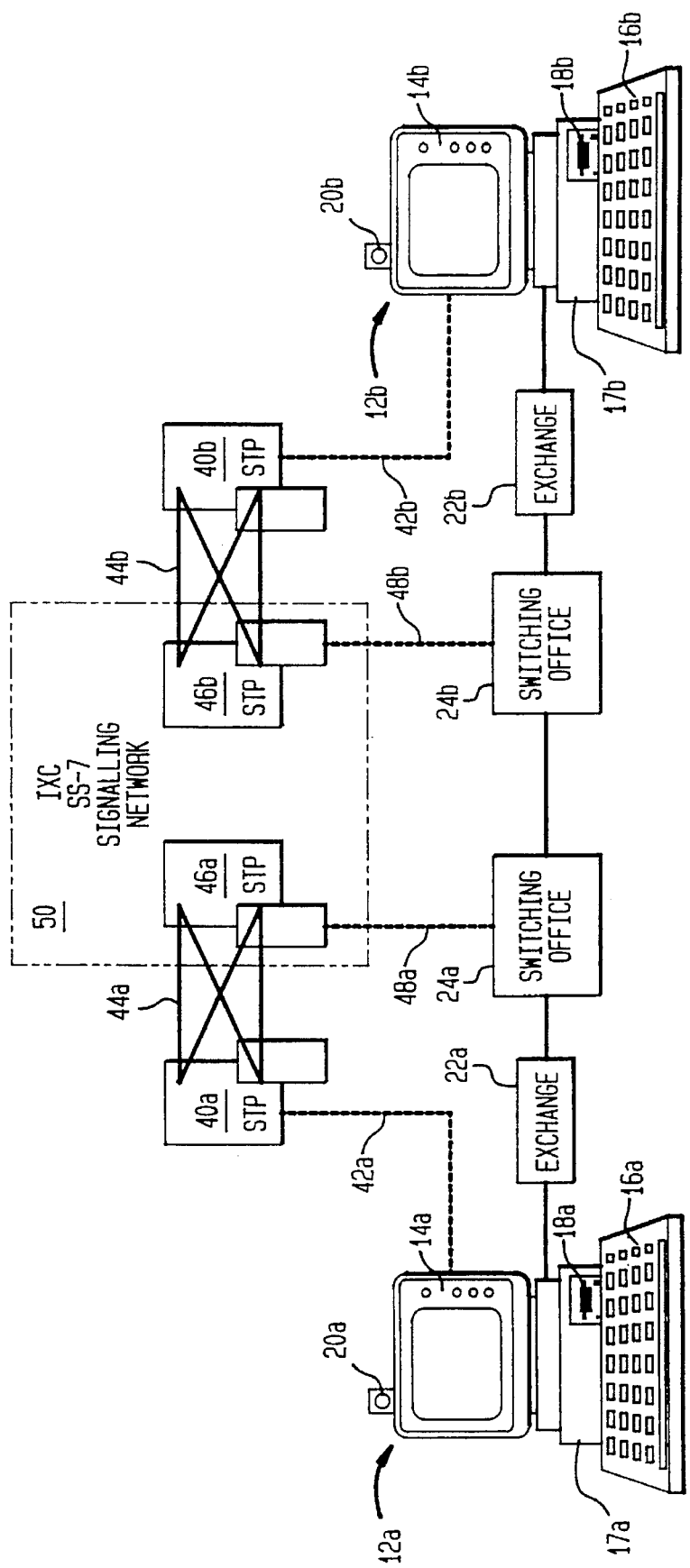
FIG. 5 is a block representation of an alternate embodiment of one stage of the present invention.

With reference now to FIG. 5, and as explained above, although the exchange of the data discretes such as port addresses or phone numbers, acknowledgments, etc. from workstation 12a to workstation 12b may be carried out through the bearer channels and, specifically, through the second or video-only bearer channel, that technique is least preferred because the information on the second bearer channel will often be disturbed to accommodate transfer of the data discretes. In a most preferred embodiment, therefore, the data discretes are communicated between the respective workstations using the signal portion or D-channel of the BRI lines, thus providing more bandwidth for the video bit stream(s) on the second bearer channel.

FIG. 5 depicts a block diagram of the most preferred process for communicating the data discretes through the signal portion of a BRI line. As shown, each local central office 22a, 22b is connected via an A-link 42a, 42b to a local central office signal transfer point (STP) 40a, 40b. Each STP 40 is, in turn, connected to a toll switching office STP 46a, 46b contained in an interexchange signalling network 50 such, for example, as an SS-7 signalling network by AT&T Corp., via D-link quad connections 44a and 44b. Additional A-links 48 are provided for connecting the toll switching office STP 46 to each toll switching office 24. In this embodiment of the invention, the data discretes are communicated between workstations 12a and 12b through the signal channel of the BRI connection which is connected through A-links 42 to the respective toll switching office STPs 46a and 46b via local STPs 40a and 40b through D-link quad connections 44a and 44b. The data discretes are, in turn, provided to each workstation's toll switching office STP 46 through the signalling network 50. This configuration permits the out-of-band transfer of data discretes, i.e. outside of the bearer channels, thereby providing for increased or enhanced information capacity on the bearer channels.

Thus, while there have been shown and described and pointed out fundamental novel features of the invention as applied to the currently preferred embodiments thereof, it will be understood that various omissions and substitutions and changes in the form and details of the methods and apparatus illustrated, and in their operation, may be made by those skilled in the art without departing from the spirit of the invention. It is the intention, therefore, to be limited only as indicated by the scope of the claims appended hereto.

What is claimed is:

1. A process of converting, into a bridged conference-accommodating call, a point-to-point multimedia telephone call wherein audio and video information are exchanged between users at first and second terminal devices connected to an ISDN communications line having first and second bearer channels, said first channel being configured for carrying video and audio information bit streams and said second channel being configured for carrying a video information bit stream in said point-to-point call, said process comprising the steps of:

determining, on a multipoint control unit (MCU) having a plurality of MCU ports, if a predetermined number of MCU ports is available for use and, if so, reserving said predetermined number of ports for connection to at least said first and second bearer channels;

disconnecting said second bearer channel from said point-to-point call;

connecting said disconnected second bearer channel to one of said reserved ports of the MCU;

reformatting said disconnected second bearer channel to carry the audio and video information bit streams carded by said first bearer channel;

acknowledging, from the MCU to said first and second terminal devices, successful connection of said reformatted second bearer channel to said one of said reserved MCU ports;

disconnecting said first bearer channel from said point-to-point call upon successful connection of said reformatted second bearer channel to said one of said reserved MCU ports;

connecting said disconnected first bearer channel to another of said reserved MCU ports; and reformatting said disconnected first bearer channel for carrying the video information bit stream of said second bearer channel, so that the exchange of at least audio information between the users is uninterrupted throughout said process.

2. The process of claim 1, wherein said determining step is performed by querying said MCU from said first terminal device.

3. The process of claim 2, wherein an address is associated with each reserved MCU port and wherein said determining step further comprises providing the addresses of at least some of said reserved ports to said first terminal device.

4. The process of claim 3, further comprising the step of communicating the provided address of one of the reserved MCU ports from said first terminal device to said second terminal device.

5. The process of claim 4, wherein the ISDN line further includes a signal channel and wherein said providing step and said communicating step are carried out through said signal channel.

6. The process of claim 5, further comprising connecting, after reformatting of said disconnected first bearer channel, a third terminal device to another reserved port on the MCU for accommodating, in a conference call with the users at the first and second terminal devices, a user at said third terminal device.

7. The process of claim 4, wherein the ISDN line includes a signal channel and wherein said providing step is carried out through said signal channel.

8. The process of claim 1, further comprising connecting, after reformatting of said disconnected first bearer channel, a third terminal device to another reserved port on the MCU for accommodating, in a conference call with the users at the first and second terminal devices, a user at said third terminal device.

9. A process of converting, into a bridged conference-accommodating call, a point-to-point multimedia telephone call in which audio and video information are exchanged between users at first and second terminal devices connected to an ISDN communications line having first and second bearer channels, said first channel being configured for carrying audio and video information bit streams and said second channel being configured for carrying a video information bit stream in said point-to-point call, said process comprising the steps of:

determining, on a multipoint control unit (MCU) having a plurality of MCU ports, if a predetermined number of MCU ports is available for use and, if so, reserving said predetermined number of ports for connection to at least said first and second bearer channels;

disconnecting said second bearer channel from said point-to-point call;

connecting said disconnected second bearer channel between each of said first and second terminal devices and one of said reserved ports on the MCU to form an MCU-connected second bearer channel to enable communication by each said terminal device, through said MCU-connected second bearer channel, with said MCU;

reformatting said MCU-connected second bearer channel for carrying the audio and video information bit streams of said first bearer channel;

duplicating the video and audio information bit streams of said first bearer channel onto said MCU-connected second bearer channel so that the audio and video information bit streams of the first bearer channel are exchanged between the first and second terminal device through the MCU-connected second bearer channel and the MCU and thereby assuring an uninterrupted exchange of at least the audio information bit stream between the first and second terminal devices and throughout said converting process;

acknowledging, from said MCU to each said terminal device, successful connection of said MCU-connected second bearer channel from each said terminal device to the MCU;

disconnecting said first bearer channel from said point-to-point call upon successful connection of said MCU-connected second bearer channel from each said terminal device to the MCU;

connecting said disconnected first bearer channel between each said terminal device and another of said reserved ports on the MCU to form an MCU-connected first bearer channel to enable communication by each said terminal device, through said MCU-connected first and second bearer channels, with the MCU; and reformatting said MCU-connected first bearer channel for carrying the video information bit stream of said second bearer channel so that all of the audio and video information bit streams originally exchanged between the first and second terminal devices in the point-to-point call are now exchanged between the terminal devices through the MCU.

10. The process of claim 9, wherein said determining step is performed by querying said MCU from said first terminal device.

11. The process of claim 10, wherein an address is associated with each reserved MCU port and wherein said determining step further comprises providing the addresses of at least some of said reserved ports to said first terminal device.

12. The process of claim 11, further comprising the step of communicating the provided address of one of the reserved MCU ports from said first terminal device to said second terminal device.

13. The process of claim 12, wherein the ISDN line further includes a signal channel and wherein said providing step and said communicating step are carried out through said signal channel.

14. The process of claim 13, further comprising connecting, after reformatting of said MCU-connected first bearer channel, a third terminal device to another available port on the MCU for accommodating, in a conference call with the users at the first and second terminal devices, a user at said third terminal device.

15. The process of claim 12, wherein the ISDN line includes a signal channel and wherein said providing step is carried out through said signal channel.

16. The process of claim 9, further comprising connecting, after reformatting of said MCU-connected first bearer channel, a third terminal device to another available port on the MCU for accommodating, in a conference call with the users at the first and second terminal devices, a user at said third terminal device.

* * * * *